US007866832B2

(12) United States Patent
Jaynes et al.

(10) Patent No.: US 7,866,832 B2
(45) Date of Patent: Jan. 11, 2011

(54) MULTI-PROJECTOR INTENSITY BLENDING SYSTEM

(75) Inventors: Christopher O. Jaynes, Lexington, KY (US); Stephen B. Webb, Lexington, KY (US)

(73) Assignee: Mersive Technologies, LLC, Lexington, KY (US)

( * ) Notice: Subject to any disclaimer, the term of this patent is extended or adjusted under 35 U.S.C. 154(b) by 968 days.

(21) Appl. No.: 11/675,226

(22) Filed: Feb. 15, 2007

(65) Prior Publication Data
US 2007/0188719 A1    Aug. 16, 2007

Related U.S. Application Data

(60) Provisional application No. 60/773,419, filed on Feb. 15, 2006.

(51) Int. Cl.
G03B 21/00    (2006.01)

(52) U.S. Cl. .................. 353/121; 345/1.3; 348/745; 353/94

(58) Field of Classification Search ............ 353/69, 353/70, 94; 345/589, 596, 629, 630; 700/31, 700/52; 348/383, 740, 745, 747
See application file for complete search history.

(56) References Cited

U.S. PATENT DOCUMENTS

| | | | | |
|---|---|---|---|---|
| 4,974,073 | A * | 11/1990 | Inova ............................ 348/38 |
| 5,136,390 | A * | 8/1992 | Inova et al. ................. 348/383 |
| 5,734,446 | A * | 3/1998 | Tokoro et al. ............... 348/745 |
| 6,115,022 | A * | 9/2000 | Mayer et al. ................ 345/418 |
| 6,222,593 | B1 * | 4/2001 | Higurashi et al. ........... 348/745 |
| 6,434,265 | B1 * | 8/2002 | Xiong et al. ................ 382/154 |
| 6,456,339 | B1 * | 9/2002 | Surati et al. ................ 348/745 |
| 6,480,175 | B1 * | 11/2002 | Schneider .................... 345/32 |
| 6,545,685 | B1 * | 4/2003 | Dorbie ....................... 345/582 |
| 6,570,623 | B1 * | 5/2003 | Li et al. ..................... 348/383 |
| 6,590,621 | B1 * | 7/2003 | Creek et al. .................. 349/5 |
| 6,633,276 | B1 | 10/2003 | Jaynes |
| 6,695,451 | B1 * | 2/2004 | Yamasaki et al. ............ 353/30 |
| 6,733,138 | B2 | 5/2004 | Raskar |
| 6,753,923 | B2 * | 6/2004 | Gyoten ...................... 348/383 |
| 6,814,448 | B2 * | 11/2004 | Ioka .......................... 353/69 |

(Continued)

OTHER PUBLICATIONS

International Search Report and Written Opinion dated Nov. 20, 2009 pertaining to International application No. PCT/US2009/040977.

(Continued)

*Primary Examiner*—Seung C Sohn
*Assistant Examiner*—Bao-Luan Le
(74) *Attorney, Agent, or Firm*—Lathrop & Gage LLP

(57) ABSTRACT

The present invention relates to projection systems where multiple projectors are utilized to create respective complementary portions of a projected image. The present invention also relates to methods of calibrating and operating individual image projectors. According to one embodiment of the present invention, an attenuation map is generated for the projectors and pixel intensity values are established for the projectors by applying one or more intensity transfer functions to the attenuation maps. The intensity transfer functions are configured to at least partially account for the non-linear response of the output intensity of the projectors, as a function of an input intensity control signal applied to the projectors. Additional embodiments are disclosed and claimed.

27 Claims, 4 Drawing Sheets

U.S. PATENT DOCUMENTS

| | | | |
|---|---|---|---|
| 6,819,318 | B1 | 11/2004 | Geng |
| 7,097,311 | B2 | 8/2006 | Jaynes et al. |
| 7,119,833 | B2 | 10/2006 | Jaynes et al. |
| 7,133,083 | B2 | 11/2006 | Jaynes et al. |
| 7,266,240 | B2 | 9/2007 | Matsuda |
| 2002/0024640 | A1* | 2/2002 | Ioka .................. 353/94 |
| 2002/0041364 | A1* | 4/2002 | Ioka .................. 353/69 |
| 2004/0085477 | A1* | 5/2004 | Majumder et al. ....... 348/383 |
| 2004/0169827 | A1 | 9/2004 | Kubo et al. |
| 2005/0287449 | A1* | 12/2005 | Matthys et al. ........... 430/30 |
| 2007/0195285 | A1 | 8/2007 | Jaynes et al. |
| 2007/0242240 | A1 | 10/2007 | Webb et al. |
| 2007/0268306 | A1 | 11/2007 | Webb et al. |
| 2007/0273795 | A1 | 11/2007 | Jaynes et al. |
| 2008/0024683 | A1 | 1/2008 | Damera-Venkata et al. |
| 2008/0129967 | A1 | 6/2008 | Webb et al. |
| 2008/0180467 | A1 | 7/2008 | Jaynes et al. |
| 2009/0262260 | A1 | 10/2009 | Jaynes et al. |
| 2009/0284555 | A1 | 11/2009 | Webb et al. |

OTHER PUBLICATIONS

Raskar, Ramesh et al.; Seamless Projection Overlaps using Image Warping and Intensity Blending; Fourth International Conference on Virtual Systems and Multimedia; Nov. 1998; pp. 1-5; Gifu, Japan.

Webb, Stephen et al.; The DOME: A Portable Multi-Projector Visualization System for Digital Artifacts; IEEE Workshop on Emerging Display Technologies (w/VR 2005); Mar. 2005; Bonn, Germany.

Harville, Michael et al.; Practical Methods for Geometric and Photometric Correction of Tiled Projector Displays on Curved Surfaces; International Workshop on Projector-Camera Systems (ProCams 2006); Jun. 17, 2006; New York.

Fiala, Mark; Automatic Projector Calibration Using Self-Identifying Patterns; Proceedings of the 2005 IEEE Computer Society Conference on Computer Vision and Pattern Recognition (CVPR'05); 2005.

Griesser, Andreas et al.; Automatic Interactive Calibration of Multi-Projector-Camera Systems; Proceedings of the 2006 Conference on Computer Vision and Pattern Recognition Workshop; 2006.

Rehg, James et al.; Projected Light Displays Using Visual Feedback; Research at Intel; 2003; Intel Corporation.

Office Action pertaining to U.S. Appl. No. 11/737,823 dated Dec. 1, 2009.

U.S. Appl No. 11/737,821, Notice of Allowance dated Oct. 8, 2010, 10 pages.

* cited by examiner

MULTI-PROJECTOR INTENSITY BLENDING SYSTEM

CROSS-REFERENCE TO RELATED APPLICATIONS

This application claims the benefit of U.S. Provisional Application Ser. No. 60/773,419, filed Feb. 15, 2006. This application is related to commonly assigned, copending U.S. patent application Ser. Nos. 11/735,258, filed Apr. 13, 2007, 11/737,817, filed Apr. 20, 2007, 11/737,821, filed Apr. 20, 2007, 11/737,823, filed Apr. 20, 2007, and 11/675,236, filed Feb. 15, 2007.

BACKGROUND AND SUMMARY OF THE INVENTION

The present invention relates to projection systems where multiple projectors are utilized to create respective complementary portions of a projected image, which may be a video or still image. The present invention also relates to methods of calibrating the intensity response function of projectors. According to one embodiment of the present invention, a method of projecting an image utilizing a plurality of projectors is provided. According to the method, at least two of the projectors project overlapping portions of the image in a global display space. Overlapping pixels in the global display space are identified. An attenuation map is generated for the projectors such that the attenuation values for the overlapping pixels of the attenuation map are at least partially a function of the number of projectors contributing to the overlap. Pixel intensity values are established for the projectors by applying one or more intensity transfer functions to the attenuation maps generated for the projectors. The intensity transfer functions may be applied to the attenuation maps in conjunction with input intensity values. The intensity transfer functions are configured to at least partially account for the non-linear response of the output intensity of the projectors, as a function of an input intensity control signal applied to the projectors.

In accordance with another embodiment of the present invention, pixel intensity values for the projectors are established by utilizing the attenuation maps such that the pixel intensity values are a function of the relative magnitudes of the distance-to-edge values for the edges of the projectors that overlap the selected pixel.

In accordance with yet another embodiment of the present invention, pixel intensity values are established for the projectors by perturbing the attenuation maps to reduce image artifacts in the image, such that the pixel intensity values are a function of an attenuation map perturbation routine.

In accordance with yet another embodiment of the present invention, a method of calibrating the intensity response function of a projector or operating the image projector according to a calibrated intensity response function is provided. According to the method, a calibration image comprising an intensity-adjusted portion and a dithered portion is generated. Pixels of the intensity-adjusted portion are driven at a fraction of maximum input intensity and the ratio of the on/off pixels in the dithered portion is selected to correspond to the fractional input intensity of the intensity-adjusted portion. Pixel intensity in either the intensity-adjusted portion or the dithered portion is adjusted to match the apparent intensity of the remaining portion. This pixel intensity adjustment is repeated for one or more additional fractional input intensities and the intensity adjustments are used to establish a calibrated intensity response function for the image projector. The intensity transfer function is configured to at least partially account for the non-linear response of the output intensity of the projector as a function of an input intensity control signal applied to the projector.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
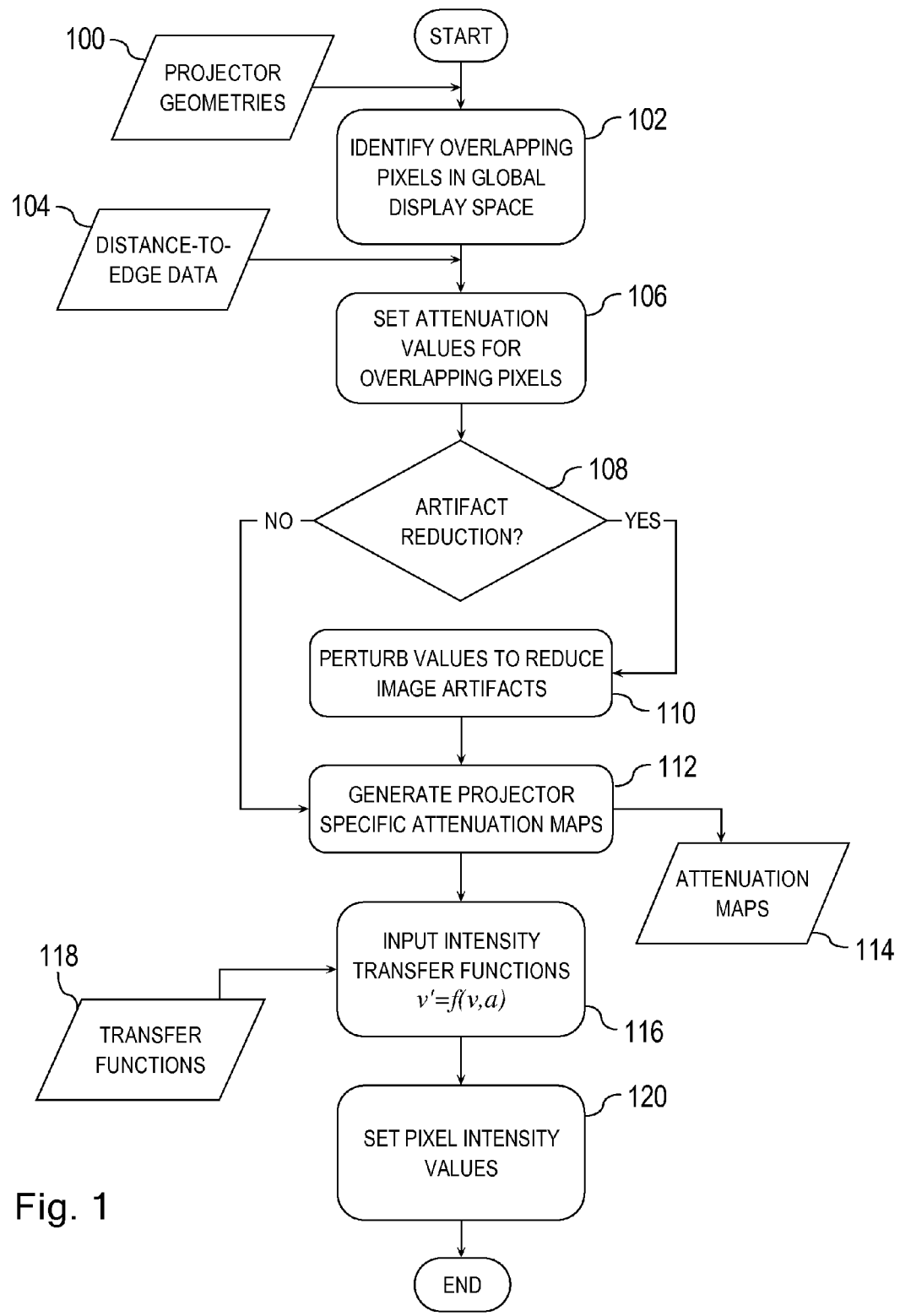
FIG. 1 is a flow chart illustrating a process for setting pixel intensity values according to one embodiment of the present invention.

The flow chart of FIG. 1 illustrates a method of projecting an image utilizing a plurality of projectors and a process for setting pixel intensity values for the projectors according to one embodiment of the present invention. For the illustrated projection method, the projected image is formed by two or more overlapping image portions, as would be the case for a panoramic, 360°, or other type of display having dimensions that are beyond the typical projection capabilities of a single projector or would result in insufficient resolution in the projected image of a single projector. The present inventors have recognized that the overlapping image portions of these types of multi-projector display systems give rise to intensity blending challenges in the overlapping portions of the image because these regions of the display are illuminated by more than one projector and, as such, can be visibly brighter than non-overlapping portions of the image.

According to the embodiments of the present invention illustrated in FIG. 1, overlapping pixels in the global display space are identified by referring to the respective image geometries of the projectors used to generate the image (see steps 100, 102). For example, referring to FIG. 4, where three distinct projector geometries P1, P2, P3 produced by projectors 402, 404, and 406, respectively, are illustrated, the composite image could include distinct overlapping image portions P1/P2, P1/P3, P1/P2/P3, etc. In addition, distinct overlapping pixels $p_i$, $p_j$, $p_k$, etc., can be identified in each overlapping image portion. Once the overlapping pixels have been identified, intensity attenuation values can be established for the pixels in the overlapping portions of the image based on the number of projectors contributing to the overlap (see step 106). Projector-specific attenuation maps are then generated for the projectors using the intensity attenuation values for the overlapping pixels (see steps 112, 114). For example, where two projectors are positioned side-by-side such that 50% of their respective projected images overlap, the attenuation map for the projector on the left would contain values of 1.0 (full intensity) for all of the pixels in the left half of the projected image and 0.5 (half intensity) for the pixels on the right half of the projected image. Similarly the intensity map for the right projector would contain entries of 0.5 for the left half and 1.0 for the right half. The resulting light output of the two projectors attenuated according to these respective attenuation maps would result in a composite image of uniform intensity.

Figure 2:
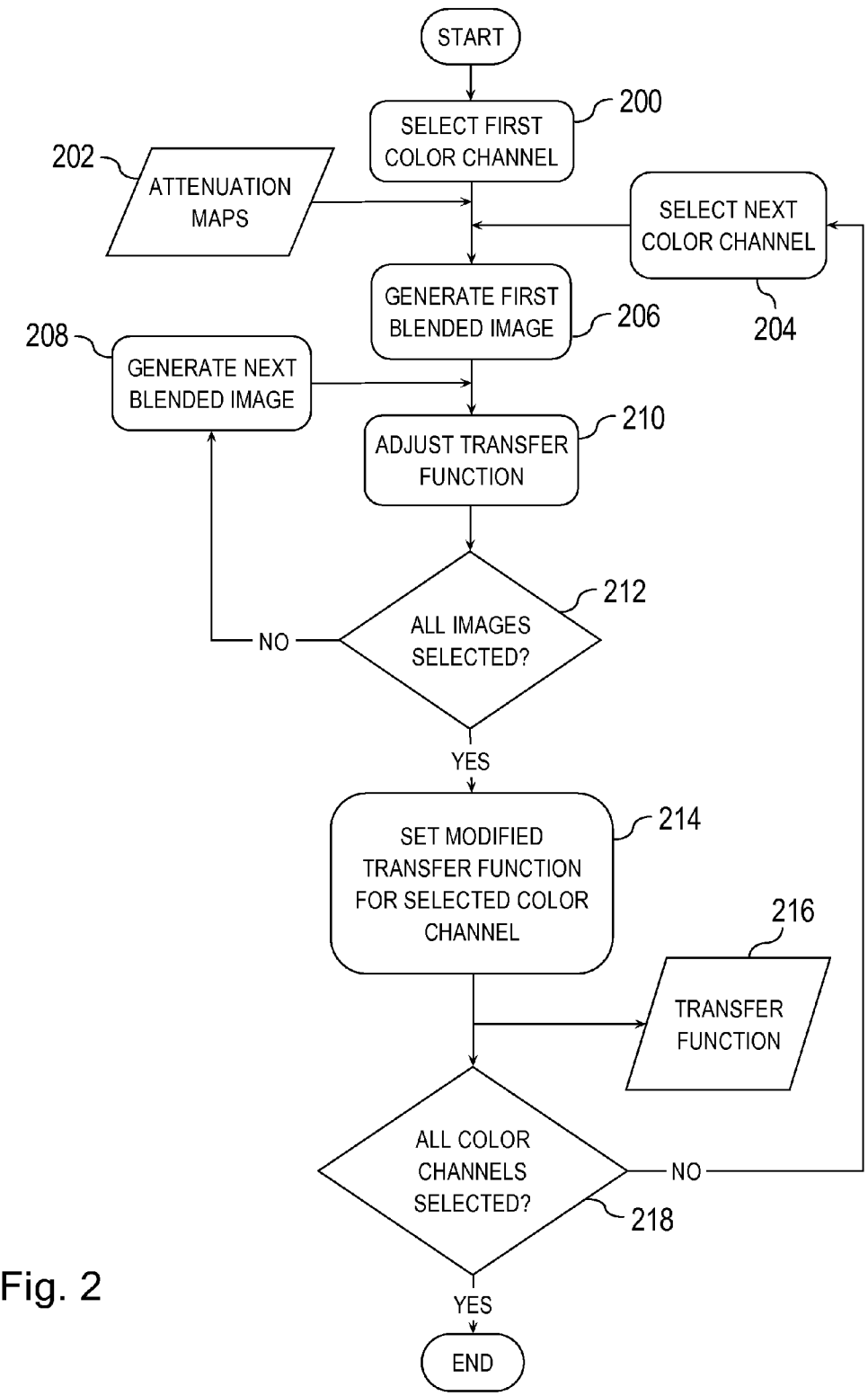
FIGS. 2 and 3 are flow charts illustrating alternative routines for establishing intensity transfer functions according to embodiments of the present invention.
Figure 3:
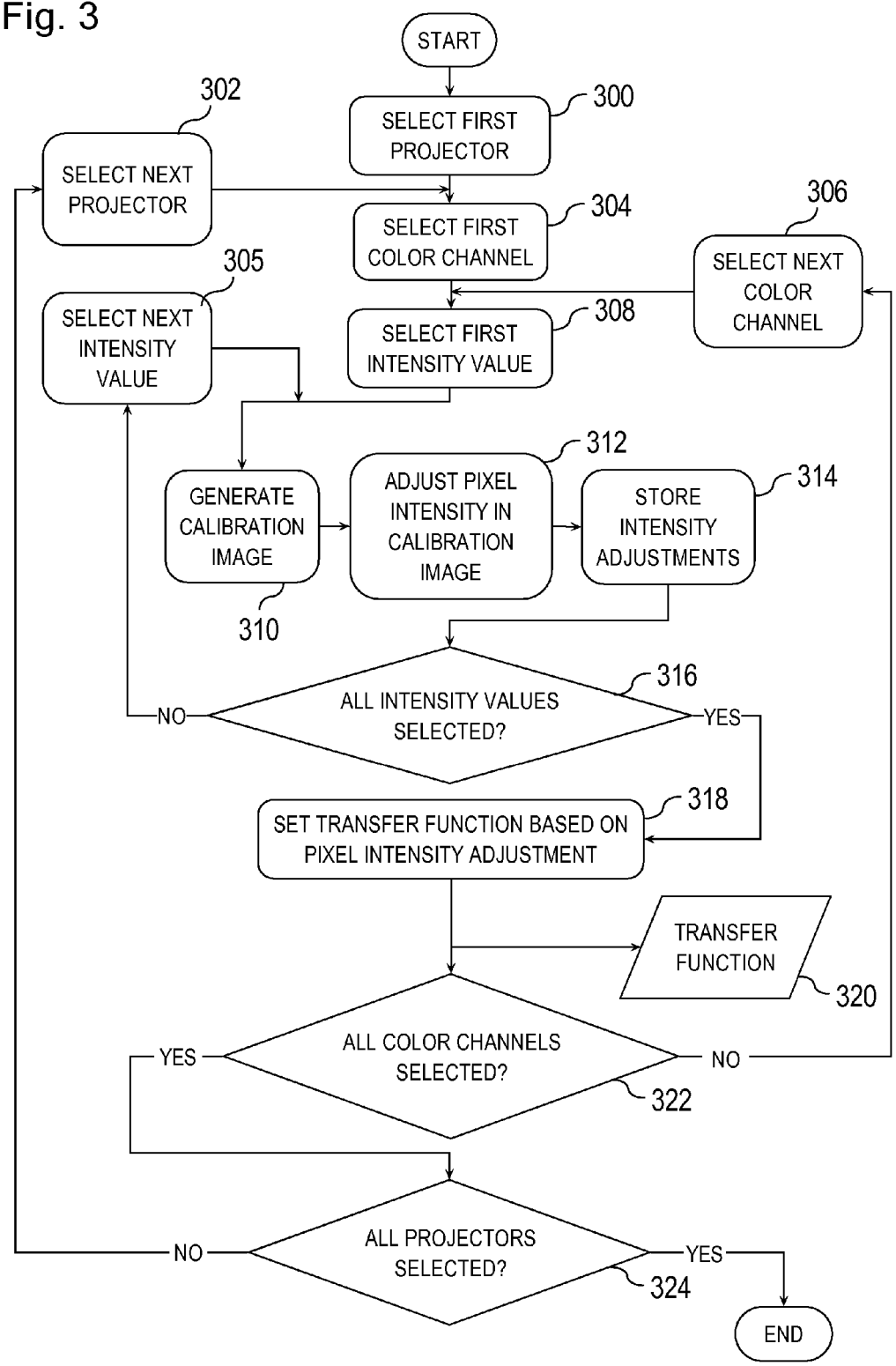

The present invention also contemplates the use of intensity transfer functions in establishing pixel intensity values. As is illustrated in FIG. 1, the pixel intensity values for the projectors can be set by applying one or more intensity transfer functions to the attenuation maps generated for each projector (see steps 116, 118, 120). The intensity transfer functions may be applied to the attenuation maps in conjunction with input intensity values. Typically, the intensity transfer functions are configured to at least partially account for the non-linear response of the output intensity of the projectors, as a function of an input intensity control signal applied to the projectors. FIGS. 2 and 3, described in detail below, illustrate two different procedures for generating suitable transfer functions.

Pixel intensity values may also be subject to an artifact reduction operation, if desired (see step 108). More specifically, acknowledging that some applications of the methodology the present invention may yield visual artifacts in the projected image, an artifact reduction operation may be applied to reduce any problematic artifact structure in the attenuation maps. For example, the process of FIG. 1 may employ an attenuation map perturbation routine adding noise or attenuation factor smoothing to the attenuation values in the map (see step 110). Contemplated artifact reduction methods according to the present invention can also involve digital filtering techniques. For example, a low pass filter function can be incorporated in the artifact reduction operation. Alternatively, the artifact reduction operation can take into account the characteristics of the human visual system by targeting only those artifacts that are likely to be noticeable by a human observer. For example, by using a "Just Noticeable Difference" (JND) metric, a function can be applied to the resulting image that modifies the attenuation map parameters in such a way as to minimize the JND.

Generally, various embodiments of the present invention contemplate a routine for generating an attenuation map where the attenuation maps are compared to a model of the human visual system in order to determine what characteristics of the attenuation map are likely to lead to artifacts that can be readily detected by the human visual system. Once identified, the attenuation map can be modified to account for such artifacts and minimize error given by the model.

Turning initially to the process for establishing transfer functions illustrated in FIG. 2, we note that it is often advantageous to employ color channel specific intensity transfer functions for the projection of multi-color images. According to the methodology illustrated in FIG. 2, after the color channel is selected (see step 200), the first of a series of blended images is generated using the attenuation maps described above with reference to FIG. 1 (see steps 202, 206, 208). Subsequent series of blended images are generated for additional color channels (see steps 204, 218). Each image in the sequence is preferably a solid uniform color. As an example consider the three image sequence where all of the pixels of the first image are given an RGB value of (1.0, 0.0, 0.0), all of the pixels of the second image are given an RGB value of (0.5, 0.0, 0.0), and all of the pixels of the third image are given an RGB value of (0.2, 0.0, 0.0). The respective pixel intensities for overlapping pixels in each blended image are adjusted to create an enhanced blended image and the various intensity adjustments that were used to create the enhanced blended image are used to establish an intensity transfer function that can be used to create blended images in real time (see steps 210, 212, 214). As is noted above, subsequent series of blended images are applied to the remaining color channels to create a uniform image display having smooth overlap regions.

It is contemplated that the intensity transfer functions established according to the process illustrated in FIG. 2 can be set by fitting a mathematical function to the initial and repeated intensity adjustments, by correlating the intensity adjustments with target output intensities and storing the correlated values in a lookup table, or by any other suitable means for representing or approximating the intensity adjustments used to create the enhanced blended image. As is illustrated in FIG. 2, the process for setting the modified transfer function is repeated for each color channel used in the projection system and separate transfer functions are generated for each color channel (see steps 204, 218).

FIG. 3 illustrates an alternative process for establishing transfer functions. According to the process of FIG. 3, projector specific and color channel specific transfer functions can be established without generating blended images in the global display space. Steps 300, 302, 306, 322, and 324 represent one suitable flow for ensuring that the routine runs through all of the selected projectors and color channels for each projector. Once the projector and color channel are selected, the intensity transfer function for the selected projector and color channel is established by first generating a calibration image comprising an intensity-adjusted portion and a dithered portion (see steps 308, 310). The pixels of the intensity-adjusted portion of the calibration image are driven at a fraction of the maximum input intensity for driving the pixels. For example, the pixels of the intensity-adjusted portion may be driven at 50% intensity.

Similarly, the dithered portion of the calibration image is driven such that the ratio of on/off pixels in the dithered portion corresponds to the fractional input intensity of the intensity-adjusted portion. For example, where the pixels of the intensity-adjusted portion are driven at 50% intensity, the dithered portion will be driven such that 50% of the pixels in the dithered portion are in the "on" state and 50% of the pixels in the dithered portion are in the "off" state. The on/off pixels should be arranged in a checkerboard pattern or some other pattern selected to create an apparently uniform intensity distribution in the dithered portion of the calibration image.

Upon display of the calibration image, the pixel intensity in the dithered portion is adjusted until the apparent intensity of the dithered portion matches that of the intensity-adjusted portion (see step 312). Alternatively, the pixel intensity in the intensity-adjusted portion can be adjusted until its apparent intensity matches that of the dithered portion. In either case, the pixel intensity adjustments are carried out for one or more additional fractional input intensities (see steps 305 and 316) and the adjustments are used to establish the intensity transfer function for the selected color channel of the selected projector (see steps 314, 318, and 320). This intensity matching may be executed through the use of one or more image analysis cameras or by a human operator. As is noted above with respect to the process of FIG. 2, the intensity adjustments can be used to establish the intensity transfer function by, for example, fitting the intensity transfer function to values representing the adjustments or by correlating the initial and repeated intensity adjustments with target output intensities and storing the correlated values in a lookup table. In this manner, multi-projector images with pixel intensities modified by suitable intensity transfer functions may be projected in real time to create an effectively blended multi-projector image.

The process illustrated in FIG. 3 may be employed outside the context of a multi-projector system to establish calibrated intensity response functions for individual projectors. More specifically, it is contemplated that the pixels of the intensity-adjusted portion of the calibration image can driven at a fraction of maximum input intensity and the ratio of the on/off pixels in the dithered portion can be selected to correspond to the fractional input intensity of the intensity-adjusted portion. Pixel intensity in either the intensity-adjusted portion or the dithered portion can be adjusted to match the apparent intensity of the remaining portion. This pixel intensity adjustment can be repeated for one or more additional fractional input intensities and the intensity adjustments can be used to establish a calibrated intensity response function for the image projector. The resulting intensity response function would at least partially account for the non-linear response of the output intensity of the projector as a function of an input intensity control signal applied to the projector.

Figure 4:
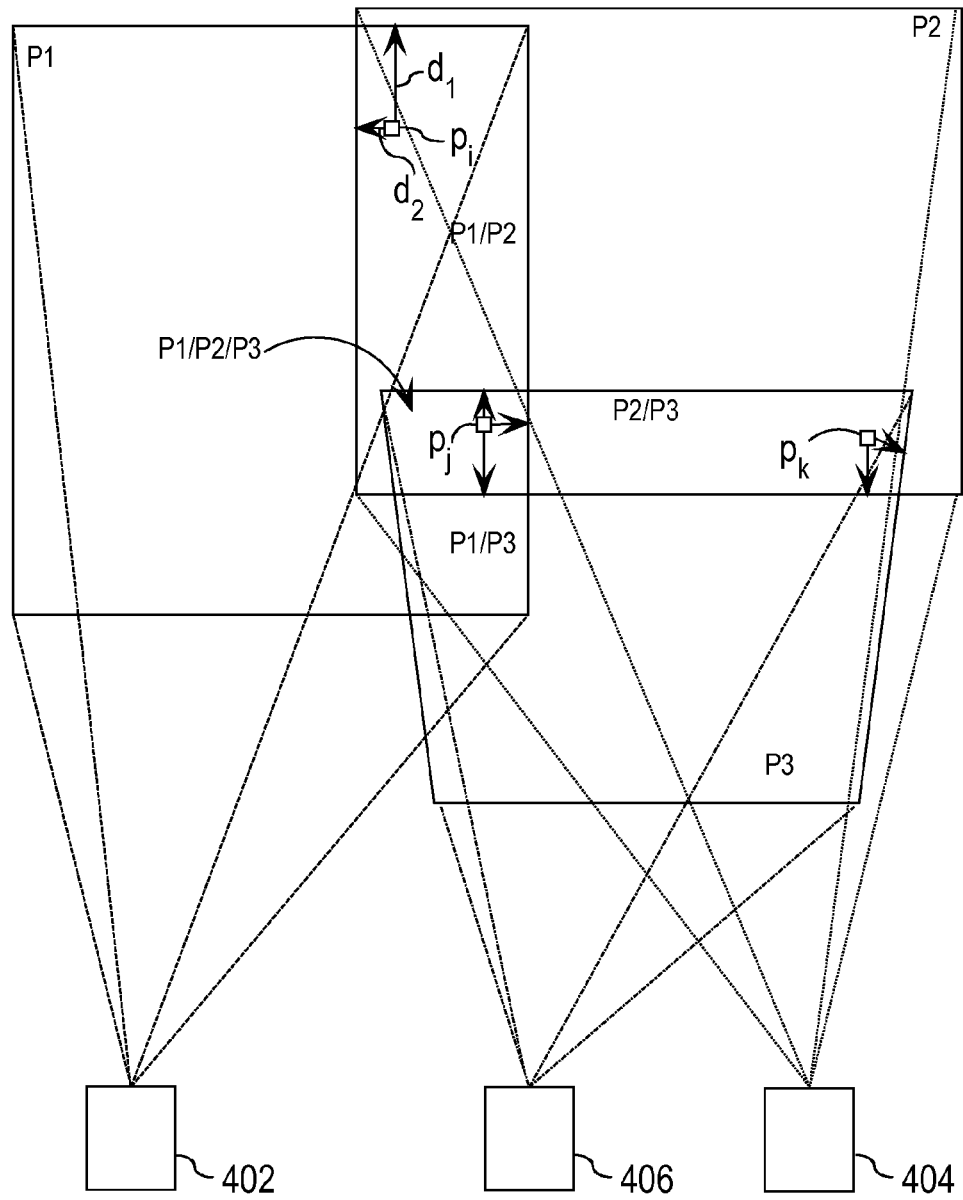
FIG. 4 is an illustration of the manner in which distance-to-edge data is obtained according embodiments of the present invention.

FIGS. 1 and 4 further illustrate the manner in which distance-to-edge data can be used to further enhance image blending in the context of a multi-projector image. Specifically, as is illustrated in FIG. 4, the pixels $p_i$, $p_j$, $p_k$, etc., in the overlapping image portions P1/P2, P1/P3, P1/P2/P3, etc., are characterized by two or more distance-to-edge values $d_1$, $d_2$, etc., representing the respective distances of a selected pixel from the closest edge of each projected image portion P1, P2, P3 in which the pixel resides. The distance-to-edge values can be measured as a direct pixel distance in the frame buffer of each projector, as distances in a planar or spherical global coordinate system, or in any other suitable conventional or yet to be developed manner. Once measured, the relative magnitudes of these distance-to-edge values can be used to further refine the pixel intensity values for the pixels in the overlapping image portions (see step 104). This calibrated response function can be applied to the input intensities prior to application of the attenuation maps to yield enhanced image blending.

For example, and not by way of limitation, the proximity of a particular pixel to the edge of a projected image portion is directly proportional to the distance of the pixel from the projector. As such, at uniform input pixel intensity, the intensity of pixels near the edge of the projected image will be less than the intensity of pixels near the center of the projected image because the pixels near the edge of the image are farther away from the projector. Where a single pixel is overlapped by two projected images, in most cases, it will lie closer to the center of the image of one of the projectors than the other and, as such, one projector can be said to dominate pixel intensity for the selected pixel. Accordingly, the distance-to-edge values can be used to define a degree to which each projector dominates pixel intensity for the pixels in the overlapping portions of the image. Pixel intensity can then be established such that more dominant projectors are subject to less attenuation for pixels where the distance-to-edge values define the projector as the more dominant projector.

It is also contemplated that the distance-to-edge data for each pixel can merely be selected to represent the respective distances of a selected pixel from the closest edges of any projected image portion in which the pixel resides, as opposed to the edges of each image portion in which the pixel resides. Given this data, an average or weighted average of the distance-to-edge values for the selected pixel can be used in establishing the pixel intensity values for the selected pixel. For example, the average distance of the pixel to the three closest image portion edges can be determined and used to establish pixel intensity.

The distance-to-edge data can be utilized to alter pixel intensity independent of the intensity adjustment effectuated by the aforementioned intensity transfer functions. For example, the relative magnitudes of the distance-to-edge values for the selected pixel can be used in establishing the pixel intensity values for selected pixels in the attenuation map, prior to input of the intensity transfer functions, as is illustrated in FIG. 1.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of projecting an image utilizing a plurality of projectors, wherein at least two of the projectors project overlapping portions of the image in a global display space, the method comprising:
    identifying overlapping pixels in the global display space;
    generating an attenuation map for the projectors, wherein the attenuation values for the overlapping pixels of the attenuation map are at least partially a function of the number of projectors contributing to the overlap;
    establishing pixel intensity values for the projectors by applying one or more intensity transfer functions to the attenuation maps generated for the projectors, wherein the intensity transfer functions are configured to at least partially account for the non-linear response of the output intensity of the projectors, as a function of an input intensity control signal applied to the projectors, and the intensity transfer functions are established by methodology comprising:
    generating a blended image using the attenuation map;
    adjusting pixel intensity for overlapping pixels in the blended image to create an enhanced blended image;
    repeating the pixel intensity adjustment for overlapping pixels in the blended image at one or more additional image intensity values; and
    using the initial and repeated intensity adjustments to establish the intensity transfer function.

2. A method as claimed in claim 1 wherein the intensity transfer function is established by fitting a mathematical function to the initial and repeated intensity adjustments.

3. A method as claimed in claim 1 wherein the intensity transfer function is established by correlating the initial and repeated intensity adjustments with target output intensities and storing the correlated values in a lookup table.

4. A method as claimed in claim 1 wherein:
    pixels in the overlapping portions of the image are characterized by two or more distance-to-edge values $d_1$, $d_2$, $d_i$, representing the respective distances of a selected pixel from the closest edge of each projected portion of the image in the global display space; and the relative magnitudes of the distance-to-edge values for the selected pixel are used in establishing the pixel intensity values for the selected pixel.

5. A method as claimed in claim 4 wherein the distance-to-edge values are measured as a direct pixel distance in the frame buffer of each projector or as distances in a planar or spherical global coordinate system.

6. A method as claimed in claim 4 wherein:
the distance-to-edge values are used to define a degree to which each projector dominates pixel intensity for the pixels in the overlapping portions of the image; and
pixel intensity is established such that more dominant projectors are subject to less attenuation for pixels where the distance-to-edge values define the projector as a more dominant projector.

7. A method as claimed in claim 4 wherein the relative magnitudes of the distance-to-edge values for the selected pixel are used in establishing the pixel intensity values for the selected pixel independent of the intensity transfer function.

8. A method as claimed in claim 4 wherein the relative magnitudes of the distance-to-edge values for the selected pixel are used in establishing the pixel intensity values for selected pixels in the attenuation map.

9. A method as claimed in claim 1 wherein:
pixels in the overlapping portions of the image are characterized by two or more distance-to-edge values $d_1, d_2, d_i$, representing the respective distances of a selected pixel from the closest edges of projected portions of the image in the global display space; and
an average or weighted average of the distance-to-edge values for the selected pixel is used in establishing the pixel intensity values for the selected pixel.

10. A method as claimed in claim 1 wherein the method further comprises an artifact reduction operation, the artifact reduction operation comprising an attenuation map perturbation routine adding noise, attenuation factor smoothing, digital filtering, or JND metrics to the attenuation values in the map.

11. A method as claimed in claim 1 wherein the method further comprises an artifact reduction operation where the attenuation map is compared to a model of the human visual system in order to determine what characteristics of the attenuation map are likely to lead to artifacts that can be readily detected by the human visual system and, once identified, the attenuation map is modified to account for such artifacts.

12. An image projection system comprising a plurality of projectors and an intensity blending controller programmed to execute the method of projecting an image recited in claim 1.

13. A method of calibrating the intensity response function of a projector or operating the image projector according to a calibrated intensity response function, the method comprising:
generating a calibration image comprising an intensity-adjusted portion and a dithered portion, wherein pixels of the intensity-adjusted portion are driven at a fraction of maximum input intensity and the ratio of on/off pixels in the dithered portion is selected to correspond to the fractional input intensity of the intensity-adjusted portion;
adjusting pixel intensity in either the intensity-adjusted portion or the dithered portion to match the apparent intensity of the remaining image portion;
repeating the pixel intensity adjustment for one or more additional fractional input intensities;
using the initial and repeated intensity adjustments to establish an intensity response function for the image projector, wherein the intensity response function is configured to at least partially account for the non-linear response of the output intensity of the projector as a function of an input intensity control signal applied to the projector; and
utilizing the intensity response function as an input to an image-blending intensity transfer function to establish pixel intensity values for the projector.

14. A method of calibrating the intensity response function of a projector or operating the image projector according to a calibrated intensity response function, the method comprising:
generating an attenuation map for the projectors, wherein the attenuation values for the overlapping pixels of the attenuation map are at least partially a function of the number of projectors contributing to the overlap;
generating a blended image using the attenuation map;
adjusting pixel intensity for overlapping pixels in the blended image to create an enhanced blended image;
repeating the pixel intensity adjustment for overlapping pixels in the blended image at one or more additional image intensity values;
using the initial and repeated intensity adjustments to establish an intensity transfer function for the image projector, wherein the intensity response function is configured to at least partially account for the non-linear response of the output intensity of the projector as a function of an input intensity control signal applied to the projector; and
utilizing the intensity response function as an input to an image-blending intensity transfer function to establish pixel intensity values for the projector.

15. A method of projecting an image utilizing a plurality of projectors, wherein at least two of the projectors project overlapping portions of the image in a global display space, the method comprising:
identifying overlapping pixels in the global display space;
generating an attenuation map for the projectors, wherein the attenuation values for the overlapping pixels of the attenuation map are at least partially a function of the number of projectors contributing to the overlap; and
establishing pixel intensity values for the projectors by applying one or more intensity transfer functions to the attenuation maps generated for the projectors, wherein the intensity transfer functions are configured to at least partially account for the non-linear response of the output intensity of the projectors, as a function of an input intensity control signal applied to the projectors, and the intensity transfer functions are established by methodology comprising:
generating a calibration image comprising an intensity-adjusted portion and a dithered portion, wherein pixels of the intensity-adjusted portion are driven at a fraction of maximum input intensity and the ratio of on/off pixels in the dithered portion is selected to correspond to the fractional input intensity of the intensity-adjusted portion;
adjusting pixel intensity in either the intensity-adjusted portion of the calibration image or the dithered portion of the calibration image to match the apparent intensity of the remaining portion of the calibration image;

repeating the pixel intensity adjustment for one or more additional fractional input intensities; and using the initial and repeated intensity adjustments to establish the intensity transfer function.

16. A method as claimed in claim 15 wherein:

pixels in the overlapping portions of the image are characterized by two or more distance-to-edge values $d_1, d_2, d_i$, representing the respective distances of a selected pixel from the closest edge of each projected portion of the image in the global display space; and the relative magnitudes of the distance-to-edge values for the selected pixel are used in establishing the pixel intensity values for the selected pixel.

17. A method as claimed in claim 16 wherein the distance-to-edge values are measured as a direct pixel distance in the frame buffer of each projector or as distances in a planar or spherical global coordinate system.

18. A method as claimed in claim 16 wherein:

the distance-to-edge values are used to define a degree to which each projector dominates pixel intensity for the pixels in the overlapping portions of the image; and pixel intensity is established such that more dominant projectors are subject to less attenuation for pixels where the distance-to-edge values define the projector as a more dominant projector.

19. A method as claimed in claim 16 wherein the relative magnitudes of the distance-to-edge values for the selected pixel are used in establishing the pixel intensity values for the selected pixel independent of the intensity transfer function.

20. A method as claimed in claim 16 wherein the relative magnitudes of the distance-to-edge values for the selected pixel are used in establishing the pixel intensity values for selected pixels in the attenuation map.

21. A method as claimed in claim 15 wherein:

pixels in the overlapping portions of the image are characterized by two or more distance-to-edge values $d_1, d_2, d_i$, representing the respective distances of a selected pixel from the closest edges of projected portions of the image in the global display space; and an average or weighted average of the distance-to-edge values for the selected pixel is used in establishing the pixel intensity values for the selected pixel.

22. A method as claimed in claim 15 wherein the method further comprises an artifact reduction operation, the artifact reduction operation comprising an attenuation map perturbation routine adding noise, attenuation factor smoothing, digital filtering, or JND metrics to the attenuation values in the map.

23. A method as claimed in claim 15 wherein the method further comprises an artifact reduction operation where the attenuation map is compared to a model of the human visual system in order to determine what characteristics of the attenuation map are likely to lead to artifacts that can be readily detected by the human visual system and, once identified, the attenuation map is modified to account for such artifacts.

24. An image projection system comprising a plurality of projectors and an intensity blending controller programmed to execute the method of projecting an image recited in claim 15.

25. A method as claimed in claim 15 wherein the calibration image is generated from a single projector.

26. A method as claimed in claim 15 wherein the initial and repeated intensity adjustments are used to establish the intensity transfer function by fitting the intensity transfer function to values representing the adjustments.

27. A method as claimed in claim 15 wherein the initial and repeated intensity adjustments are used to establish the intensity transfer function by correlating the initial and repeated intensity adjustments with target output intensities and storing the correlated values in a lookup table.

* * * * *